United States Patent
Wiederkind-Klein (10) Patent No.: US 8,931,340 B2
(45) Date of Patent: Jan. 13, 2015

(54) CONTACTLESS FILLING LEVEL MEASUREMENT OF LIQUIDS

(75) Inventor: Alexander Wiederkind-Klein, Steinbach (DE)

(73) Assignee: Siemens Healthcare Diagnostics Products GmbH, Marburg (DE)

( * ) Notice: Subject to any disclaimer, the term of this patent is extended or adjusted under 35 U.S.C. 154(b) by 301 days.

(21) Appl. No.: 13/167,219

(22) Filed: Jun. 23, 2011

(65) Prior Publication Data

US 2011/0314907 A1    Dec. 29, 2011

(30) Foreign Application Priority Data

Jun. 26, 2010   (DE) .......................... 10 2010 025 118

(51) Int. Cl.
*G01F 23/26*   (2006.01)

(52) U.S. Cl.
CPC ..................... *G01F 23/268* (2013.01)
USPC ....................................................... 73/304 C

(58) Field of Classification Search
CPC ... G01F 23/268; G01F 23/266; G01F 23/263; G01F 23/265
USPC .............................. 73/290 R, 304 C
See application file for complete search history.

(56) References Cited

U.S. PATENT DOCUMENTS

| | | | | |
|---|---|---|---|---|
| 4,674,329 A * | 6/1987 | Mulder | ....................... | 73/304 C |
| 4,749,988 A | 6/1988 | Berman et al. | | |
| 6,101,873 A * | 8/2000 | Kawakatsu et al. | ......... | 73/304 C |
| 6,490,920 B1 * | 12/2002 | Netzer | ....................... | 73/304 C |
| 6,539,797 B2 * | 4/2003 | Livingston et al. | ......... | 73/304 C |
| 7,161,361 B2 * | 1/2007 | Qu et al. | ....................... | 324/690 |
| 2001/0037680 A1 | 11/2001 | Buck et al. | | |
| 2010/0126268 A1 | 5/2010 | Baily et al. | | |

FOREIGN PATENT DOCUMENTS

| | | |
|---|---|---|
| EP | 0377508 A1 | 7/1990 |
| EP | 1312897 A2 | 5/2003 |
| EP | 1961575 B1 | 6/2011 |
| WO | 2004/042480 | 5/2004 |

OTHER PUBLICATIONS

"CLC Series Miniature Capacitive Continuous Liquid Level Sensors", www.sensortechnics.com, pp. 1-5.

* cited by examiner

*Primary Examiner* — Hezron E Williams
*Assistant Examiner* — Rodney T Frank
(74) *Attorney, Agent, or Firm* — King & Spalding L.L.P.

(57) ABSTRACT

The invention relates to a device and a method for the contactless capacitive filling level measurement of a filling medium in a container, the device having a plurality of measurement electrodes and at least one reference electrode.

12 Claims, 4 Drawing Sheets

CONTACTLESS FILLING LEVEL MEASUREMENT OF LIQUIDS

This application claims priority to the German Patent Application 102010025118.6, filed Jun. 26, 2010, which is hereby incorporated by reference.

The present invention relates to a device for the noninvasive contactless capacitive filling level measurement.

In filling level measurements, the filling level (the standing height) of liquids and bulk materials in a container are recorded by means of filling level meters.

In a conventional filling level measurement method, a float comprising a float body is introduced into a vessel containing a liquid. This float contains, for example, a magnet whose field actuates, through the vessel wall, magnetic relays which are arranged as an array. The filling level in the vessel can thereby be measured. A problem with this is that the float body will be immersed to a different extent depending on the density of the liquid, which vitiates the measurement result. With these devices, the float also necessarily comes in contact with the liquid, the effect of which may be that the liquid is contaminated or the float—depending on the properties of the liquid—is affected by the liquid.

Other known methods for filling level measurement comprise conductivity measurement, pressure measurement, measurement with ultrasound (in which case the filling height is determined by the signal time of flight), weight measurement of the container, differential pressure measurement, optical measurement or capacitance measurement.

Capacitive filling level measurement uses the different permittivity $\in$ of the filling material compared with gases or air.

In invasive capacitive filling level measurement methods, a probe located inside the container and, for example, the electrically conductive container wall form an electrical capacitor. If the probe is in air, a particular low initial capacitance will be measured. If the container is filled, then the capacitance of the capacitor rises with increasing coverage of the probe. Probe electronics convert the capacitance into an electrical pulse sequence and amplify it. Evaluation electronics calculate the measurement value from the pulse rate. The capacitance change of the medium is converted into a signal proportional to the filling level, and makes it possible to display the filling level.

This method has the disadvantage that the probe, just like the aforementioned float, can be affected by the liquid depending on property of the latter. Additionally, if the container is part of a system, each time the container is changed there is a risk that the probe will be mechanically or electrically damaged.

Furthermore, capacitive sensors can also be used in methods for noninvasive capacitive filling level measurement. These methods are distinguished in that no part of the filling level sensor comes in contact with the filling medium whose filling height is intended to be determined.

The active surface of a capacitive sensor contains electrodes, with the aid of which the dielectric conditions in the vicinity are picked up. For example, the sensor comprises two electrodes which are arranged in the manner of a plate capacitor which has been folded open. A radiofrequency alternating electric field is generated between these electrodes. This field penetrates nondestructively through the material to be measured.

The capacitance of the capacitor depends on the permittivity of the filling material. The term "permittivity" (symbol: $\in$) indicates the transparency of a material for electric fields. A vacuum also has an associated permittivity since, in a vacuum, electric fields can also be set up or electromagnetic fields can propagate.

The permittivity number (relative permittivity) $\in_r = \in / \in_0$ is the ratio of $\in$ to the electric constant $\in_0$ (vacuum permittivity). The dimensionless quantity $\in_r$ characterizes the field-attenuating effects of dielectric polarization inside electrically insulating materials, and is closely related to the electric susceptibility $\chi$. The term "dielectric constant" for permittivity is obsolete and should no longer be used.

Since most media have a different permittivity compared with air or a vacuum, filling a vessel on which there is a capacitive filling level sensor leads to a rise in the capacitance between the electrodes.

The fact is first used that, as soon as a conductive or nonconductive object approaches, the electrical capacitance of the measurement electrode with respect to the surroundings or with respect to a reference electrode changes according to the distance and the material of the measurement object. Capacitive sensors are thus capable of reacting contactlessly to the approach of an object—i.e. without directly touching—with an electrical switching signal. Since capacitive sensors can in this way also detect through nonmetallic separating walls, they are suitable in particular for filling level monitoring of liquids, pastes or bulk materials.

In order to determine the capacitance of a capacitor, the ohmic discharge current between individual electrodes of the capacitor is generally measured. In this case, the capacitor is connected in series with an alternating-current milliammeter to an alternating voltage source. The current I which then flows and is displayed by the instrument depends on the capacitive impedance of the capacitor. For this, a measurement frequency should be selected which is so low that the ohmic resistance is dominant over the capacitive current in both media.

As an alternative, it is possible to measure the time which the voltage across the capacitor has taken to fall to a particular value (for example 33%). After this time has elapsed, for example, a counter which produces a count event may be activated, or the elapsed time may be output as a measurement value.

For noninvasive capacitive filling level measurement, the following procedure is in this case adopted: if one of the electrodes is for example next to a medium having a low permittivity, for example air, a low initial capacitance will first be measured. If the container is filled with a medium of higher permittivity, for example water, then the capacitance of the capacitor will rise with increasing proximity area of the capacitor electrode. A measurement value which is proportional to the proximity area of the capacitor electrode may then be picked up, as described above.

An example of a capacitive sensor, which is used for filling level measurement, is the sensor "CLC" (Capacitive Level Sensor) from Sensortechnics (http://www.sensortechnics.com/download/DS_Standard-CLC_E_11663.pdf). This sensor has a single measurement electrode and a single reference electrode, and is fastened on the outside of a container wall.

A disadvantage with this sensor and other known methods, and the devices associated with them, is however the sensitivity to external interfering effects which can vitiate the measurement result. The interfering effects may for example originate from radiofrequency voltage sources, operating personnel or other liquid containers in close spatial proximity with a variable filling level. Particularly in laboratories with a plurality of apparatuses and automatic analyzers arranged in close spatial proximity, in which radiofrequency voltage sources are used, such external interferences are very likely to occur relatively frequently and strongly. Such a sensor, which is fastened on an (almost) empty container, will for example falsely display that the container is full or partially filled when an object, for example a hand or a machine part, comes close to the measurement electrode.

Furthermore, sensors of this type are also susceptible to other effects from the outside. For example, an air gap between the measurement field and the measurement container will lead to a reduction of the measurement signal.

If the filling level sensor is part of a system, for example an automatic analyzer for studying clinical patient samples, this false measurement can lead to significant complications in the course of further working steps.

Furthermore, the measurement accuracy of such sensors depends very greatly on correct calibration, so that significant measurement errors can occur and the user friendliness is greatly restricted.

A device which has less susceptibility to interference by external effects would therefore be of great advantage.

Furthermore, a device whose measurement quality depends less on the quality of the calibration would be of great advantage.

EP 1312897 A2 describes a different capacitive filling level sensor. This sensor comprises a vertical arrangement of metal plates, wherein two metal plates respectively form a capacitor.

It is an object of the present invention to provide a device for the contactless capacitive filling level measurement of a filling medium in a container, which avoids the aforementioned disadvantages and, in particular, has less susceptibility to interference by effects from the outside.

The object is achieved inter alia in that the device for the contactless capacitive filling level measurement has a particular arrangement of at least two measurement electrodes and at least one reference electrode.

The invention therefore relates to a device for the contactless, i.e. noninvasive capacitive filling level measurement of a filling medium in a container, said device having:
 a) at least two measurement electrodes which are arranged in different horizontal planes and define a measurement surface with a vertical extent, and
 b) at least one reference electrode which defines a reference surface with a vertical extent,
in which each measurement electrode respectively forms a capacitor together with the reference electrode and an electric field can respectively be formed between each measurement electrode and the reference electrode,
and wherein the vertical extent of the reference surface corresponds at least to the vertical extent of the measurement surface.

If the device is attached to a container, the electric fields formed between the measurement electrodes and the reference electrode can pass nondestructively through the container wall and be measurably influenced by the filling level of the filling medium.

The term "electric field" is intended to mean an invisible force field which is formed by mutually attracting and repelling electric charges. The unit of the electric field strength is volt per meter (V/m), and the strength of an electric field decreases with an increasing distance from the source.

The capacitance of the capacitor depends on the permittivity of the material between the plates. The capacitance of the capacitor therefore changes when an object, which has a different permittivity than the material originally located between the plates, approaches or moves away. Consequently, when filling or emptying the container, the electrodes are influenced by the filling medium so that the capacitance of the capacitor which they form changes.

The term "filling medium" is intended to mean the material whose filling level is intended to be measured. The filling medium is preferably a liquid, a paste or a bulk material.

The term "container" is intended to mean a vessel in which the filling medium to be measured is located. The container is preferably a canister, a tank or bottle.

The term "measurement electrode" is intended to mean an electrode which respectively forms a capacitor together with the reference electrode. The total surface of all the measurement electrodes of a device defines the measurement surface of the device.

The term "reference electrode" is intended to refer below to an electrode which respectively forms a capacitor together with one or more measurement electrodes or with all the measurement electrodes. Furthermore, the reference electrode is also used as a standard point for continuous measurement. The two-dimensional extent of the reference electrode, or total surface of all the reference electrodes, of a device defines the reference surface of the device.

In one embodiment, the device has at least two reference electrodes which define the reference surface. The reference electrodes are then arranged in different horizontal planes, so that a reference electrode on a horizontal plane respectively forms a capacitor with a measurement electrode on the same horizontal plane.

As an alternative, a device according to the invention has exactly as many reference electrodes as measurement electrodes, each measurement electrode being assigned exactly one reference electrode on the same horizontal plane.

In one embodiment, the device according to the invention may have at least 3, preferably at least 5, more particularly preferably at least 10 measurement electrodes. The device may have 3, 4, 5, 6, 7, 8, 9 or 10 measurement electrodes, although in principle any number of measurement electrodes ≥2 is conceivable.

The reference and measurement electrodes consist of an electrically conductive material, preferably a metallic material, for example a copper foil. The measurement electrodes may have the same or different sizes and/or configurations. In principle, the configuration and the dimensions of the measurement electrodes are not important. They may for example be of oval, round circular, square or rectangular configuration. The dimensions are expediently related to the size of the container which holds the filling medium whose filling level is intended to be measured.

In a preferred embodiment, the measurement electrodes are each of rectangular configuration with a size of 50×18 mm or 35×12 mm.

In a preferred embodiment, the at least two measurement electrodes have differently large surfaces. This has the advantage that the filling level can be measured with different accuracy at different positions on the container. If in particular the residual content of a filling medium in a container is intended to be determined by the contactless capacitive filling level measurement, for example, the size of the measurement electrodes could decrease toward the bottom of the container in order to ensure an ever more accurate measurement result.

The dimension of the reference surface, which is formed by one or more reference electrodes, is selected so that it corresponds in its vertical extent at least to the vertical extent of the measurement surface which is defined by the vertical arrangement of the measurement electrodes, or exceeds this.

It has surprisingly been found that by the inventive use of a plurality of measurement electrodes, which respectively form a capacitor together with a reference electrode, the interfering effect of external interfering factors can be reduced and the aforementioned measurement vitiations can be avoided. This is because the device according to the invention is configured so that, in order to determine the filling level, it measures the capacitances of at least two capacitors and correlates these with one another.

Preferably, a device according to the invention furthermore comprises an evaluation instrument. This correlates the measurement values with one another in such a way that external effects have the same impact on all electrodes, so that the measurement result is compromised only minimally. This is done, for example, by ratio determination and/or a plausibility check.

The term "evaluation instrument" is intended to mean an instrument which measures the change in the capacitance of the electric fields and calculates the filling level. The measurement may be carried out in farads. As an alternative, however, the measurement value may also involve other quantities which serve as a measure of a capacitance change.

In a preferred embodiment, the measurement value obtained by measuring the at least two capacitances and subsequent calculation is presented as a unitless measurement value (for example in percent). The evaluation instrument furthermore makes it possible to validate the measurement values by comparison with stored calibration values and by comparison of the measurement values with one another.

The evaluation instrument may be provided as a separate instrument, although it may also be part of a superordinate control system.

The evaluation instrument preferably has a main processor (CPU) and/or a programmable logic controller (PLC).

The device according to the invention is preferably in contact with a superordinate control system. In order to establish communication with a superordinate control system, the device according to the invention preferably has a serial peripheral interface (for example RS-232 or RS-485) as a further component. A device according to the invention may furthermore have a voltage source. The presence of these further components has the advantage that the device can be used in any desired way as an independent unit.

The device according to the invention is preferably part of an analysis system, for example an automatic analyzer for studying clinical patient samples, in which other working steps depend on the result of the filling level measurement. The superordinate control system monitors the individual processes in the analyzer and adapts them to one another. In a preferred embodiment, the evaluation instrument of the device according to the invention is part of the superordinate control system.

In a preferred embodiment, the device is not arranged directly on the container, but instead on a holding device which allows positioning of the filling level measurement device according to the invention at a fixed distance from the container. This allows the container to be easily replaced, without the risk of damage to the evaluation device.

The device according to the invention is suitable for contactless measurement of the filling level of a wide variety of filling media, for example water, organic solvents or bulk materials, such as solids in the form of powder or granules. In principle, however, all possible filling media may be used which have a permittivity that differs from the permittivity of the material which the container holds before filling or after removal of the filling medium, to such an extent that the change in the capacitance when filling the container or when emptying the container is large enough for the evaluation instrument to be able to determine the filling level.

The following table shows relative permittivities of some materials at 18° C. and a frequency of 50 Hz.

TABLE 1

Relative permittivities of some materials at 18° C. and a frequency of 50 Hz.

| Medium | $\epsilon_r$ |
|---|---|
| Vacuum | 1 |
| Air | 1.00059 |
| Ammonia (0° C.) | 1.007 |
| Polypropylene (90° C.) | 2.1 |
| Paraffin | 2.2 |
| Benzene | 2.28 |
| Polyethylene (90° C.) | 2.4 |
| Dry wood | 2-3.5 |
| Paper | 1-4 |
| Potassium chloride | 4.94 |
| Glass | 6-8 |
| Propanol | 18.3 |
| Ethanol | 24.7 |
| Methanol | 32.6 |
| Glycerin | 42.5 |
| Water | 80.1 |
| Ice (−20° C.) | ≈100 |

The device according to the invention is suitable for contactless measurement of the filling level of filling media in a wide variety of containers. A container may consist at least partially of a material from the group glass, plastic and wood. The container may have any desired volume of between about 500 ml and about 20 l.

In a preferred embodiment, the container is a component of the device according to the invention and the reference electrode is formed by a part of the container wall. The container wall must in this case be at least partially electrically conductive, at least in the region which is provided as a reference surface.

Depending on the height of the container, the measurement electrodes will have a differently large surface, or a larger or smaller number of measurement electrodes will be used, in order to provide a measurement surface which fully covers the filling level-relevant height of the container.

The present invention also relates to a method for the noninvasive capacitive measurement of the filling level of a filling medium in a container, the method comprising the following steps:
a) arranging a device according to the invention on or in the immediate vicinity of an outer wall of the container, so that the horizontal planes on which the at least two measurement electrodes are arranged extend parallel to the surface of the filling medium;
b) measuring the capacitances of the at least two capacitors; and
c) validating the measurement values by comparing the measurement values with stored calibration values and the measurement values with one another.

So that the filling level of the filling medium can be determined correctly, at least two calibration values are required which are determined by measuring an empty container and a full container.

Because the measurement values of the individual measurement electrodes are not used directly to calculate the filling level, but instead are compared with stored calibration values and with one another, an external effect which acts on the entire device impacts only very slightly on the filling level measurement, since the external effect interferes with all electrodes uniformly.

For example, a measurement value which is vitiated by a local air gap between the container and the device at the relevant measurement electrode can be compensated.

In addition, the robustness of the filling level measurement according to the invention in relation to external effects is preferably enhanced in that, when using more than two measurement electrodes, a plausibility check can be carried out in which data of those measurement electrodes that are evidently generating an erroneous measurement value are ignored in the evaluation.

Furthermore, interrelating the electrodes with one another makes it possible to carry out a meaningful self-test of the device according to the invention, so that false measurements can be greatly minimized.

In a preferred embodiment, the capacitances of the at least two capacitors are measured continuously. The term "continuously" is intended below to mean a constant measurement which is either carried out in analog fashion or in digital fashion with a high sampling rate (="pseudo-continuous").

In another preferred embodiment, the validation of the measurement values comprises a ratio measurement. In this case, the measurement values of the at least two measurement electrodes are compared with one another and correlated with one another. It is thus not the individual absolute raw values which are crucial for the measurement, but rather the relative values which result from the comparison with other measurement values. The so-called ratio measurement is represented in FIG. 4. A device having 10 measurement electrodes is fitted on a container. The filling level of the filling medium in the container is such that the lowest three measurement electrodes are covered fully, i.e. 100%, and the fourth measurement electrode from the bottom is 70% covered. 37% of the measurement surface is therefore covered, giving a filling level of 37% or 0.37. If a sizeable air gap has formed between the measurement electrodes and the container, for example, then the measurement electrodes will measure lower absolute raw values. With the aid of a measurement electrode which is completely covered, a correction factor is determined and all measurement values of the other measurement electrodes are multiplied by this correction factor. In this way, the effect of the air gap is eliminated. The effect of filling media having nonconstant dielectric values can also be minimized in this way, for example if the properties of the filling medium to be measured are not known (unknown liquid mixtures).

The required calibration values are preferably determined by measuring a container once in the empty state and once when it is filled with the corresponding filling medium. In order to determine the calibration values, it is however also possible not to measure the same container once in the full state and once in the empty state, but to measure two containers of the same design, one of which is empty and one of which is full. None of the containers used for the calibration has to be the container which holds the filling medium, although it must be a container which is similar enough so that the filling level can subsequently be determined correctly with the calibration data found.

The method according to the invention preferably furthermore comprises a plausibility check, the individual absolute measurement values of the measurement electrodes being checked by means of a logical evaluation. If a device having 10 measurement electrodes is fitted on a container, as shown in FIG. 4, then comparison of the measurement value of the fourth measurement electrode from the bottom with the third measurement electrode from the bottom will reveal that the measurement value of the fourth electrode is lower than the measurement value of the third electrode. If the comparison of the fifth measurement electrode from the bottom with the fourth measurement electrode from the bottom then reveals that the measurement value of the fifth electrode is higher than the measurement value of the fourth electrode, this would be implausible since a measurement electrode placed higher up cannot be covered more greatly with the filling medium than a measurement electrode placed further below. The evaluation instrument thus recognizes that one of the two measurement values is not plausible and must therefore be erroneous. By comparison with the measurement values of further measurement electrodes and the logical evaluation of the measurement values, an erroneous measurement, for example due to a temporary or local interference effect (air gap, approach of an object), can be identified and displayed. As an alternative, if it is found that the value of a single measurement electrode is erroneous and that enough other plausible measurement values are available, the erroneous measurement value may be ignored in the filling level measurement.

Drawings

Figure 1:
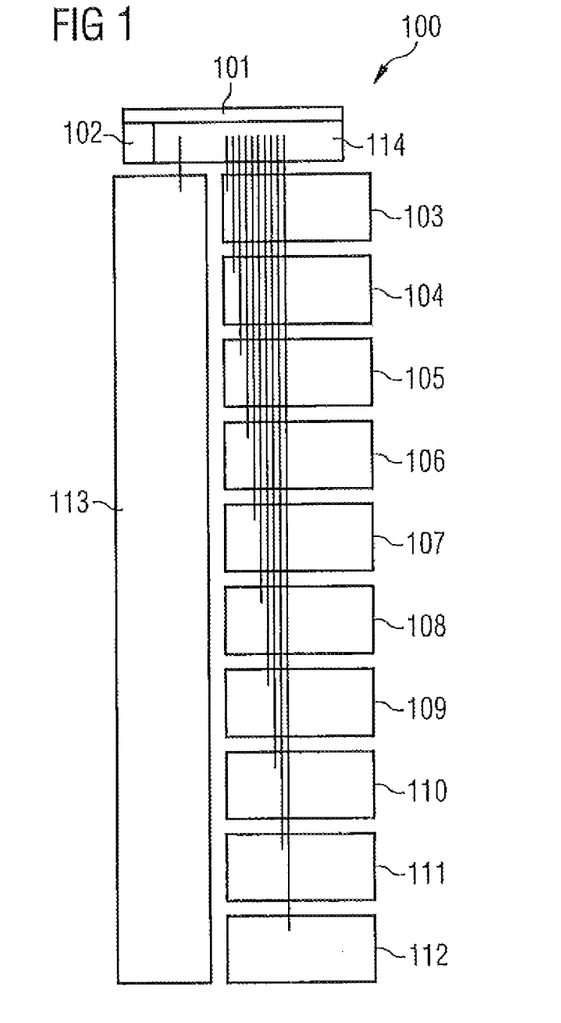
FIG. 1 shows a schematic representation of a preferred embodiment of the device according to the invention.

FIG. 1 shows a schematic representation of a plan view of a preferred embodiment of the device 100 according to the invention. In this embodiment, the device comprises a serial peripheral interface 101, a voltage regulator 102, 10 measurement electrodes (103 to 112), a reference electrode 113 and an evaluation instrument 114, here a CPU. The measurement electrodes are respectively interconnected with the reference electrode 113 so that each measurement electrode 103-112 respectively forms a capacitor together with the reference electrode 113. Consequently, the electric fields whose capacitances are to be measured respectively lie between a measurement electrode and the reference electrode 113. In this embodiment, there are a total of 10 electric fields whose capacitances can change owing to the filling level of a filling medium.

Besides determining the capacitance changes, the evaluation instrument 114 preferably carries out a plausibility check during the filling level measurement.

The determination of the capacitance changes is carried out, for example, by first calculating the measurement data of the individual measurement electrodes 103-112. This, for example, could reveal that the measurement electrodes 112 to 109 lie below the filling level while measurement electrodes 107 to 103 lie above the filling level. The measurement electrode 108 lies exactly at the height of the filling level.

In the plausibility check, the evaluation instrument determines whether one of the measurement electrodes is delivering an implausible measurement result. This could, for example, happen if an object lies in the electric field of the measurement electrode 104 and causes a capacitance which cannot be reconciled with the measurement result of the neighboring measurement electrodes 103 and 105. The measurement result of the neighboring measurement electrodes 103 and 105 shows that all three measurement electrodes 103, 104 and 105 lie above the filling level and the capacitance of the electrodes should be similar. By taking this information into account, the evaluation instrument can distinguish correct measurement results from false measurement results and appropriately calculate the filling level.

FIG. 2 shows the vitiating effect of an external interference, for example due to the proximity of a laboratory worker, on the measurement with a device from the prior art.

Figure 2A:
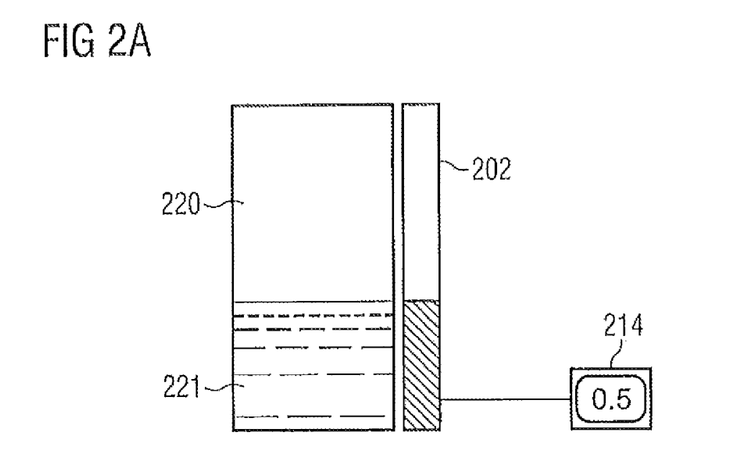
FIGS. 2, 3 and 4 illustrate the way in which the device according to the invention can suppress measurement errors.

FIG. 2A shows a measurement device which consists of a sensor 202, consisting of a single measurement electrode and a reference electrode, which is arranged in the vicinity of a container 220 partially filled with a liquid 221. Since the container 220 was previously filled with air, filling with the liquid 221 changes the dielectric properties of the immediate surroundings of the sensor, which is manifested by a modified capacitance and therefore, for example, by a modified discharge time. A measurement value is determined and displayed in the evaluation instrument 214.

Figure 2B:
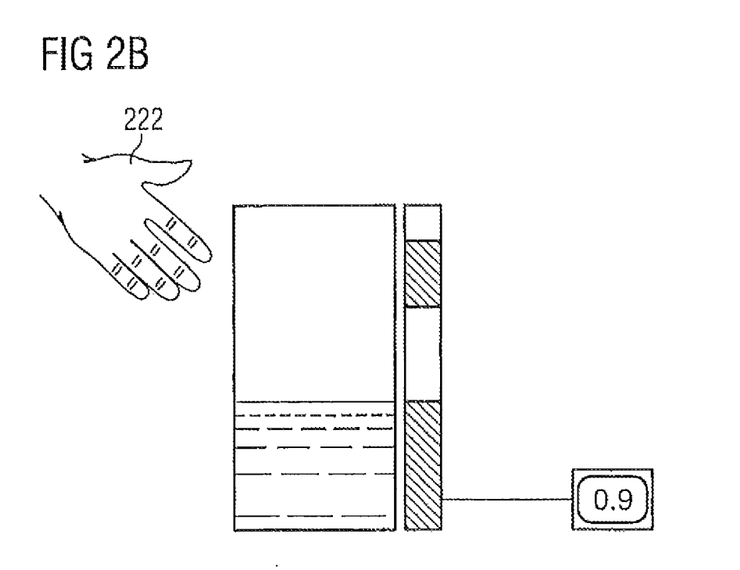

FIG. 2B shows the interfering effect of the proximity of the hand 222 of a laboratory worker. Owing to this, the dielectric properties of the medium likewise change in a region of the container 220 not filled with liquid, and the measurement value in the evaluation instrument 214 is vitiated. Such an interfering effect may also be caused by a short circuit or contamination on an electrode.

Figure 3A:
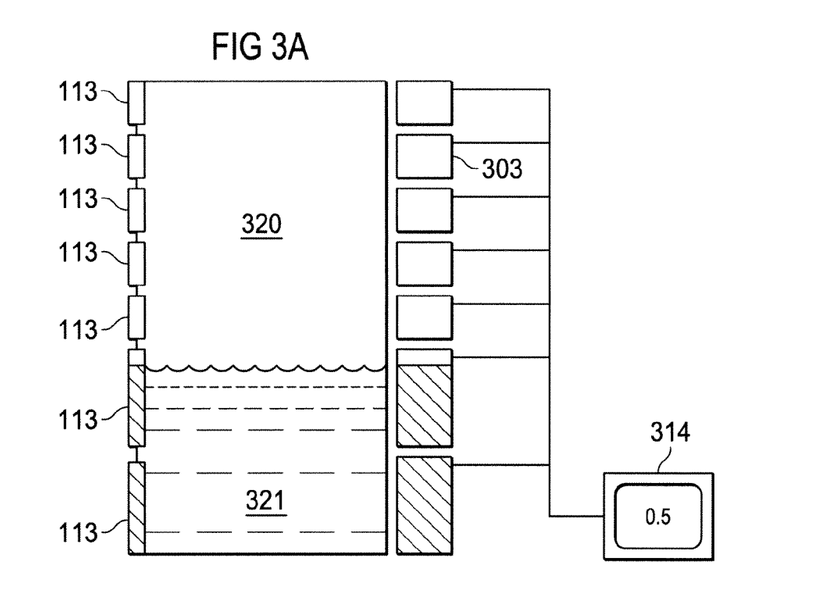
Figure 3B:
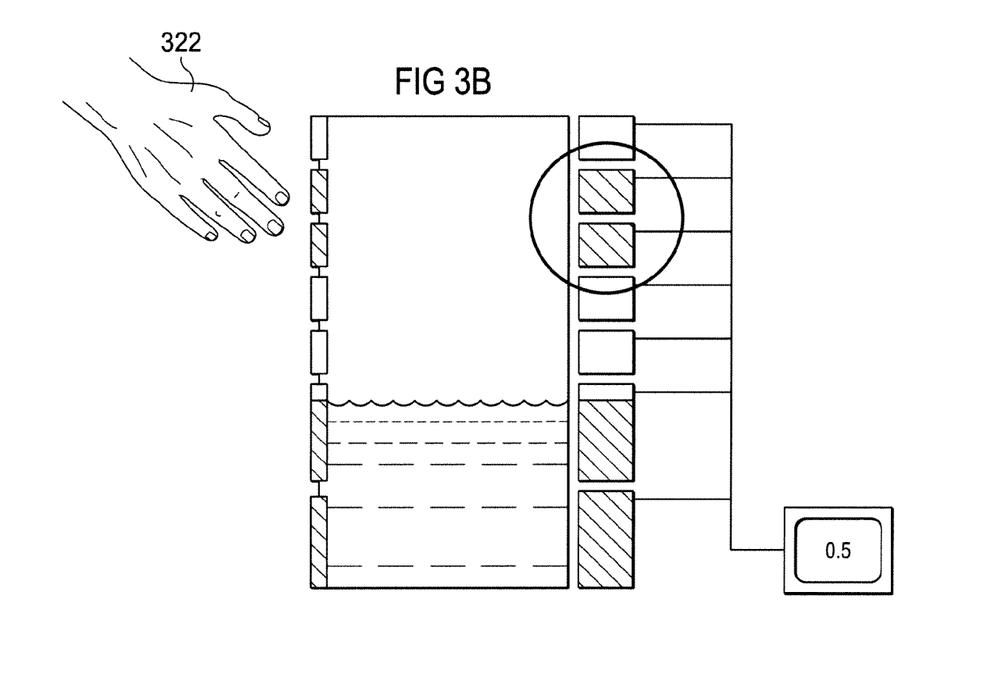

FIG. 3 shows the way in which a device according to the invention can prevent said errors. FIG. 3 shows a measurement device which consists of a plurality of measurement electrodes 303 and a reference electrode (not shown), and is arranged in the vicinity of a container 320 partially filled with a liquid 321. Since the device has more than one measurement electrode 303 and therefore more than one electric field, the measurement values of the individual measurement electrodes can be subjected to a plausibility check. In this case, it is found that the measurement values generated by the upper measurement electrodes (circle in FIG. 3B) are erroneous owing to the interfering effect of the proximity of the laboratory worker's hand 322, since they cannot represent a filling value. The evaluation instrument 314 is capable of recognizing this and ignoring the relevant measurement values.

In this way, the robustness of the device according to the invention in relation to external effects is enhanced.

Figure 4A:
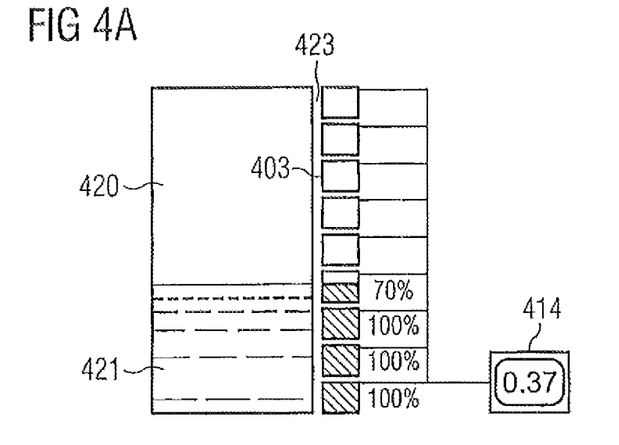
Figure 4B:
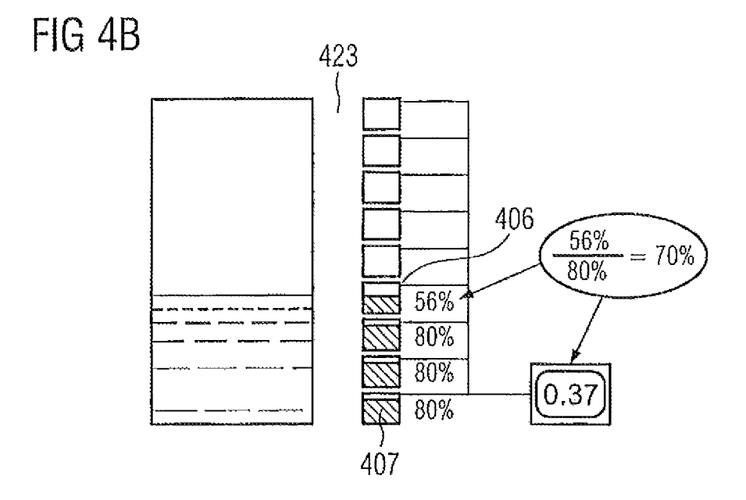

FIG. 4 shows a measurement device according to the invention which consists of ten measurement electrodes 403 and a reference electrode (not shown), and which is arranged in the vicinity of a container 420 partially filled with a liquid 421. FIG. 4A shows the intended positioning of the device according to the invention relative to the container 420. The device is meant to be separated from the container 420 by only a slight air gap 423. In this ideal layout, the evaluation instrument 414 measures a filling level of 37% or 0.37. FIG. 4B shows a position of the device according to the invention relative to the container 420 which leads to the device being separated from the container by a wider air gap 423 than intended. This leads to a general reduction of all absolute measurement values so that the lowest measurement electrode 407, which lies below the actual liquid level and should therefore actually generate a full response (100%), generates a smaller signal (for example 80%).

The second and third measurement electrodes from the bottom are also 100% covered with liquid, but exhibit only a measurement value of 80%. The fourth measurement electrode 406 from the bottom is 70% covered, but only exhibits a measurement value of 56%. Evaluation of the absolute measurement values would lead to a false filling level determination which is too low. With the aid of one of the measurement electrodes which is fully covered, for example with the aid of measurement electrode 407, however, a correction factor can be determined, in this case 80%. All measurement values can now be multiplied by this correction factor. In this way, the effect of the air gap is eliminated and the filling level is correctly determined. Thus, interfering effects which have the same impact on all measurement electrodes can be eliminated.

List Of References
device 100
serial peripheral interface 101
voltage regulator 102
measurement electrodes 103-112, 303, 403, 406, 407
reference electrode 113
evaluation instrument 114, 214, 314, 414
sensor 202
container 220, 320, 420
liquid 221, 321, 421
hand 222, 322
air gap 423

The invention claimed is:

1. A device for the noninvasive capacitive filling level measurement of a filling medium, said device comprising:
    a liquid container having a bottom and a sidewall and configured to receive and hold the filling medium,
    at least two measurement electrodes which are arranged in different horizontal planes and define a measurement surface with a vertical extent;
    at least one reference electrode which defines a reference surface with a vertical extent, each reference electrode being formed by a region of the container sidewall, each measurement electrode arranged with respect to the at least one reference electrode to define a capacitor having a respective electric field, wherein the vertical extent of the reference surface corresponds to the vertical extent of the measurement surface; and
    an evaluation instrument configured to:
        receive capacitance signals detected by the at least two measurement electrodes,
        determine changes in the measured capacitance for respective measurement electrodes,
        compare the measured capacitance of different measurement electrodes to one another,
        determine an adjustment or correction based on the comparison of the measured capacitance of different measurement electrodes to one another, and
        calculate a filling level of the filing medium held in the container based on (a) the determined changes in the measured capacitance for the respective measurement electrodes and (b) the adjustment or correction determined based on the comparison of the measured capacitance of different measurement electrodes to one another.

2. The device as claimed in claim 1, wherein at least two reference electrodes define the reference surface and wherein the reference electrodes are arranged in different horizontal planes, a measurement electrode on a horizontal plane respectively forming a capacitor with a reference electrode on the same horizontal plane.

3. The device as claimed in claim 1 wherein the device has exactly as many reference electrodes as measurement electrodes, each measurement electrode being assigned exactly one reference electrode on the same horizontal plane.

4. The device as claimed in claim 1 wherein the measurement electrodes have a different size.

5. The device as claimed in claim 1 comprising at least 3 measurement electrodes.

6. A method for the noninvasive capacitive measurement of the filling level of a filling medium in a container using a device having at least two measurement electrodes arranged in different horizontal planes and define a measurement surface with a vertical extent and at least one reference electrode which defines a reference surface with a vertical extent, each measurement electrode respectively forming a capacitor together with the at least one reference electrode so that an electric field can respectively be formed, the method comprising the following steps:

arranging the device on or in the immediate vicinity of an outer wall of the container, so that the horizontal planes on which the at least two measurement electrodes are arranged extend parallel to the surface of the filling medium;

measuring the capacitances of the at least two capacitors;

determining changes in the measured capacitances detected by respective capacitors, comparing the measured capacitances detected by different capacitors with one another, including calculating a ratio of measured capacitances detected by at least two different capacitors:

determining an adjustment or correction based on the comparison of the measured capacitances detected by different capacitors to one another; and calculating the filling level of the filing medium in the container based on (a) the determined changes in the measured capacitances detected by the respective capacitors and (b) the adjustment or correction determined based on the comparison of the measured capacitances from different capacitors.

7. The method as claimed in claim 6, wherein the measured capacitances are correlated with one another by a plausibility check.

8. The method as claimed in claim 6, wherein the capacitances are measured continuously.

9. The device as claimed in claim 6, wherein determining an adjustment or correction based on the comparison of the measured capacitance values from different measurement electrodes to one another comprises:

determining that the capacitance detected by one or more particular capacitors is erroneous based on the comparison of the measured capacitances values detected by different capacitors to one another; and determining to ignore the measured capacitances detected by one or more particular capacitors.

10. The device as claimed in claim 6, wherein determining an adjustment or correction based on the comparison of the measured capacitance values from different measurement electrodes to one another comprises:

determining a correction factor for the capacitances detected by each capacitor based on the comparison of the measured capacitances values detected by different capacitors to one another; and applying the correction factor to the capacitances detected by each capacitor.

11. A method for the noninvasive capacitive measurement of the tilling level of a filling medium in a container using a device having at least two measurement electrodes arranged in different horizontal planes and define a measurement surface with a vertical extent and at least one reference electrode which defines a reference surface with a vertical extent, each measurement electrode respectively forming a capacitor together with the at least one reference electrode so that an electric field can respectively be formed, the method comprising the following steps:

arranging the device on or in the immediate vicinity of an outer wall of the container, so that the horizontal planes on which the at least two measurement electrodes are arranged extend parallel to the surface of the filling medium;

measuring the capacitances of the at least two capacitors;

determining changes in the measured capacitances detected by respective capacitors, performing a plausibility check by comparing the measured capacitances detected by different capacitors with one another;

determining an adjustment or correction based on the results of the plausibility check; and calculating the filling level of the filing medium in the container based on (a) the determined changes in the measured capacitances detected by the respective capacitors and (b) the adjustment or correction determined based on the results of the plausibility check.

12. A method for the noninvasive capacitive measurement of the filling level of a filling medium in a container using a device having at least two measurement electrodes arranged in different horizontal planes and define a measurement surface with a vertical extent and at least one reference electrode which defines a reference surface with a vertical extent, each measurement electrode respectively forming a capacitor together with the at least one reference electrode so that an electric field can respectively be formed, the method comprising the following steps:

arranging the device on or in the immediate vicinity of an outer wall of the container, so that the horizontal planes on which the at least two measurement electrodes are arranged extend parallel to the surface of the tilling medium;

measuring the capacitances of the at least two capacitors;

determining changes in the measured capacitances detected by respective capacitors, comparing the measured capacitances detected by different capacitors with one another;

determining an adjustment or correction based on the comparison of the measured capacitances detected by different capacitors to one another, including:

determining that the capacitance detected by one or more particular capacitors is erroneous based on the comparison of the measured capacitances values detected by different capacitors to one another; and determining to ignore the measured capacitances detected by one or more particular capacitors; and calculating the filling level of the filing medium in the container based on (a) the determined changes in the measured capacitances detected by the respective capacitors and (b) the adjustment or correction determined based on the comparison of the measured capacitances from different capacitors.

\* \* \* \* \*